Nov. 8, 1938.  W. G. H. FINCH  2,136,209
PROJECTING MECHANISM
Filed Dec. 31, 1936  3 Sheets-Sheet 1

INVENTOR
William G. H. Finch
BY
ATTORNEY

Nov. 8, 1938.   W. G. H. FINCH   2,136,209
PROJECTING MECHANISM
Filed Dec. 31, 1936   3 Sheets-Sheet 2
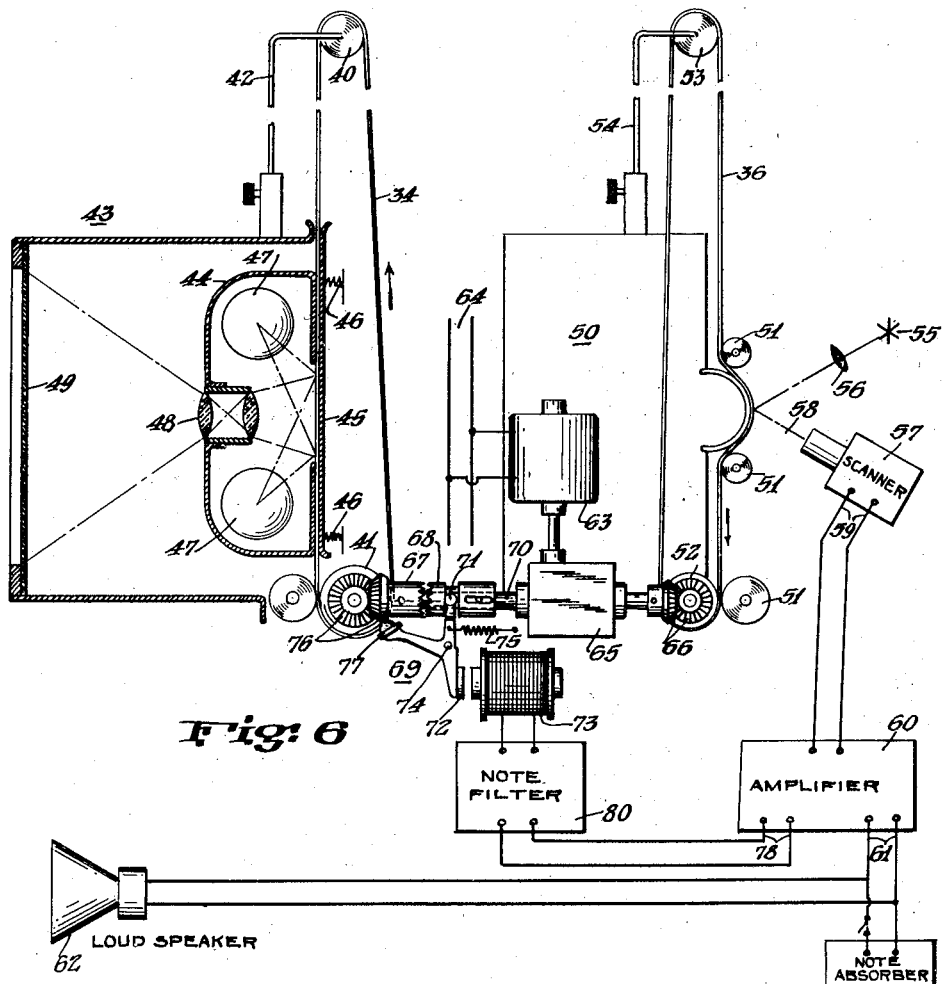
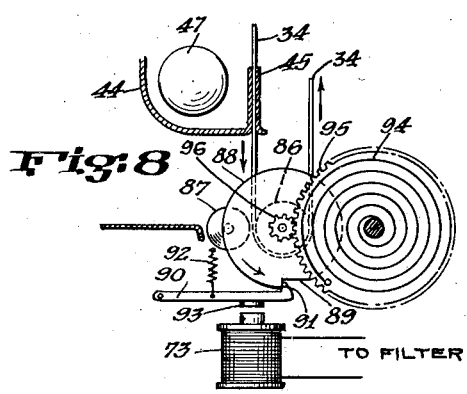
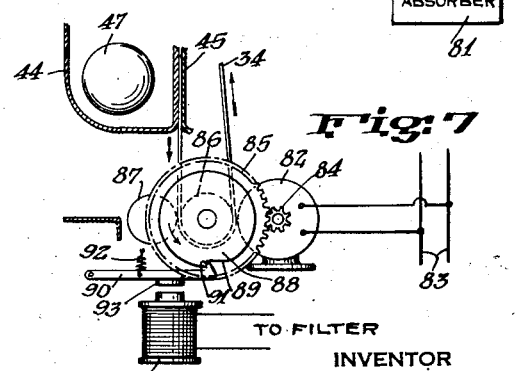
INVENTOR
William G. H. Finch
BY
Samuel Ostrolenk
ATTORNEY Nov. 8, 1938.   W. G. H. FINCH   2,136,209
PROJECTING MECHANISM
Filed Dec. 31, 1936   3 Sheets-Sheet 3
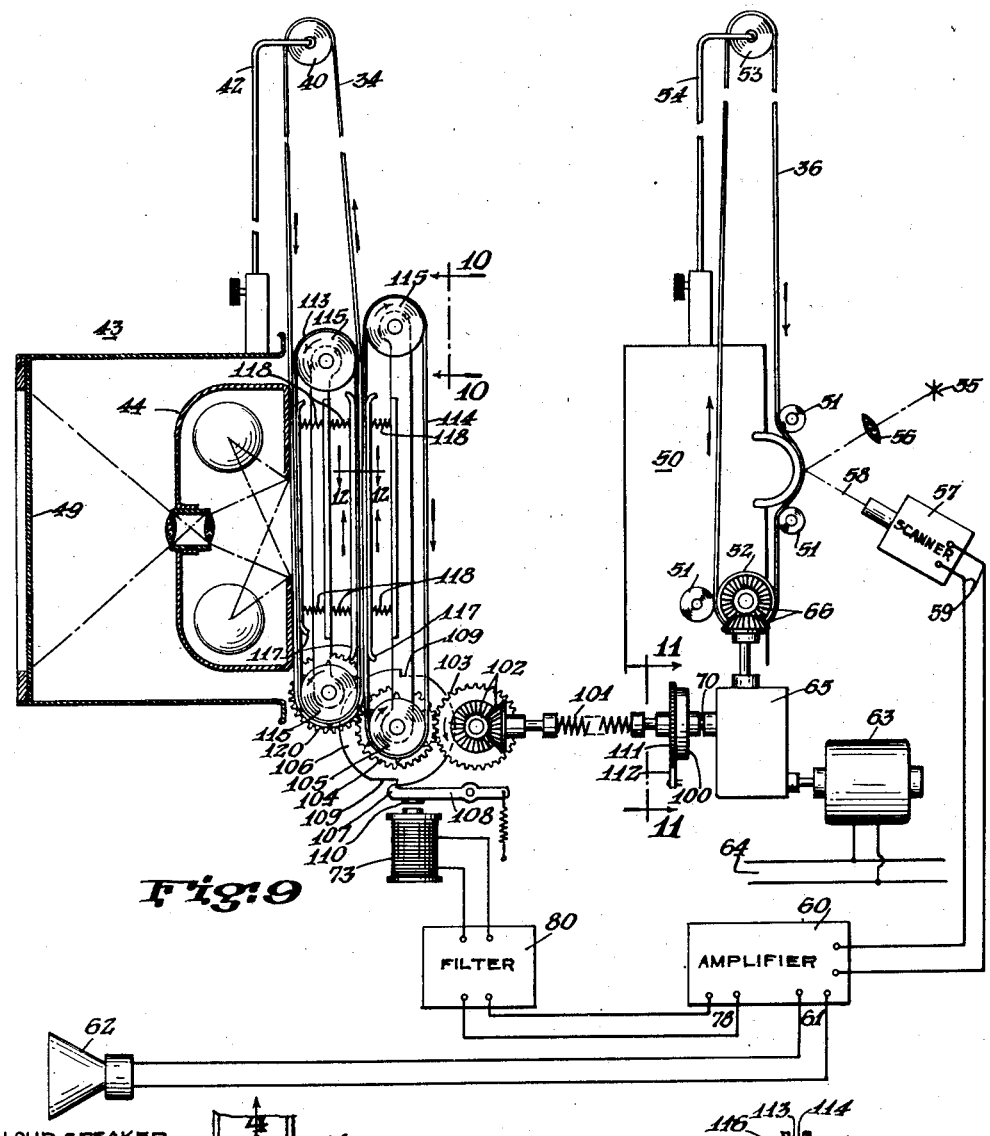
INVENTOR
William G. H. Finch
BY
ATTORNEY Patented Nov. 8, 1938

2,136,209

UNITED STATES PATENT OFFICE 2,136,209

PROJECTING MECHANISM

William G. H. Finch, Spuyten Duyvil, N. Y.

Application December 31, 1936, Serial No. 118,629

13 Claims. (Cl. 88—28)

This invention relates to novel methods of and apparatus for automatically projecting a series of picture frames in response to the accompanying sound record.

My present invention is a continuation in part of my co-pending application Serial No. 113,467, filed November 30, 1936.

An important feature of modern newspapers is the comic section consisting of drawings depicting a continuity of action to form a story, usually humorous in nature. Many children regularly follow the antics of the comic characters and impose upon older people to read the expressions of these characters. My present invention is particularly directed to provide sound records printed integral with the comic sections which records may readily be inserted in a novel reproducing machine for obtaining an audible account of the comic action. The audible rendition of comic sections or other features of a newspaper in a simple and inexpensive manner greatly enhances the value of these features to individuals, particularly to children, who cannot read. Major advantages of this invention reside in the mechanical recitation of comic sections to youngsters as well as in providing them with further entertainment in the use of the accompanying mechanism.

A further advantage of my present invention resides in the projection of the particular comic or picture frame which the accompanying sound is describing, and automatically shifting the pictures so that the next successive frame will be projected at the proper interval. The particular frame being projected is maintained stationary during the description from the sound recitation therefor. At the end of the description, a predetermined signal emanates from the recording which is used to automatically shift the projecting device to the next successive picture frame. The enjoyment of the comic sections by the child is accordingly further enhanced, particularly if he ordinarily would have difficulty in properly following the comic frames without selective projection of the frames.

In a preferred form of my invention, I print a series of sound strips, each containing a plurality of parallel sound tracks along one portion of the feature sheet containing the pictured story. The pictured story is composed of a number of picture frames arranged into several strips as is well known in the printing art. Lines and perforated markings are provided to facilitate in proper severing of the picture and sound strips from the sheet. The printing of the sound track strips upon the newspaper is similar to the printing operation of any picture in the paper. A zinc plate is formed from the original sound tracks and the steps of printing the facsimile of the sound tracks upon the sheet is similar to established printing procedure.

The reproduction apparatus for the printed sound strips is identical to that described in my co-pending application Serial No. 113,467 hereinabove referred to. A notch is cut at a predetermined portion of the sound strip which actuates a relay for shifting the sound strip transverse to the scanning beam in order to bring the next adjacent sound track into scanning position. Where the strip is formed into an endless belt, the shifting occurs at the joint between the beginning and end of the belt. Accordingly at the moment one sound track is completely scanned, corresponding to one revolution of the endless belt, the scanning operation is continued at the beginning of the next adjacent sound track.

A modification for reproducing the sound accompanying the picture frames resides in utilizing separate disk records instead of the printed sound strips on the newspaper sheet. The newspaper sound supplement records impressed on paper mat with standard printing machinery may be used for mechanical sound reproduction of the comic sections. Such records are described in my Patent No. 2,063,870 issued December 8, 1936, and in my co-pending application Serial No. 113,182, filed November 28, 1936. The mechanical reproduction apparatus is less expensive than the optical reproducing system and a wide field of application for such records instead of the printed strips is feasible. The predetermined signals at the end of the description for each picture frame are equally well impressed on the mechanical record disks for instituting the automatic frame shifting operation of my present invention.

Accordingly, an object of my present invention is to provide novel methods for projecting newspaper comic and picture sections.

Another object of my present invention is to provide novel methods for projecting newspaper comic and picture sections together with sound reproduction therefor and automatically shifting the picture frames in response to the sound recordings.

A further object of my present invention is to provide novel newspaper comic or picture section projecting mechanism for selectively projecting the picture frames in response to predetermined signals from the sound reproduction thereof.

These and further objects of my present invention will become apparent in the following description taken in connection with the drawings, in which:

Figure 6 illustrates one form for carrying out my present invention.

Figures 7 and 8 illustrate modifications of apparatus for carrying out the frame shifting operation.

Figure 9 illustrates a further modification for carrying out my present invention.

Figures 10, 11 and 12 are detailed views of Figure 9.

Figure 1:
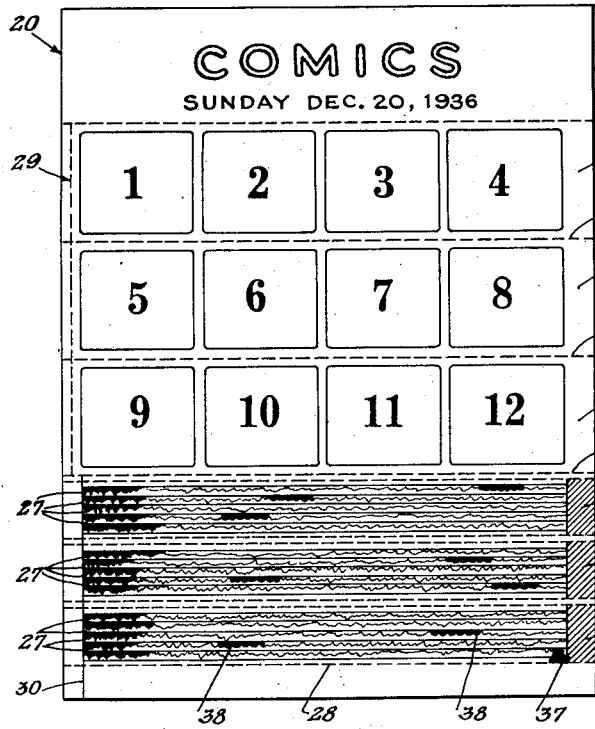
Figure 1 illustrates a preferred arrangement of a comic sheet containing a plurality of picture frames and sound tracks therefor.

Figure 1 illustrates one arrangement for the comic strips and the accompanying sound strips. The comic sheet 20 contains three strips 21, 22 and 23 containing four comic illustrations each. The squares numbered 1 to 12 represent a series of drawings or illustrations representing a continuity of action similar to the well known comic or humorous strips of newspaper sections.

Beneath the comic strips 21, 22 and 23 are arranged three sound strips 24, 25 and 26 containing a plurality of sound tracks 27. The number of sound strips or sound tracks contained by each sound strip is optional. The sound strips 24, 25 and 26 may be arranged on a sheet separate from the comic strips 21, 22 and 23. The application Serial No. 113,467 hereinabove referred to contains other possible arrangements for the sound tracks and comic strips in a newspaper.

In accordance with my present invention, the comic strips and the sound strips are each formed into a single continuous strip for reproduction. To facilitate the formation of the corresponding continuous strips, I prefer to use a series of perforations or score lines 28 about each of the strips 21 to 26. The perforations or score lines 28 are indicated by dotted lines in Figure 1. The lines 28 may be impressed upon the sheet simultaneously with the printing operation, although it is not essential. The perforation or scoring along lines 28 may be replaced by corresponding printed lines along which the operator will shear in separating the individual strips 21 to 26. I prefer to employ perforations or score lines particularly for the lines 28 bounding the sound strips 24, 25 and 26 in order to accurately predetermine the scanning position for the sound tracks 27 as described in the Ser. No. 113,467 application referred to. A score line or guide line 29 is placed adjacent one edge of the comic strips 21, 22 and 23 to facilitate in the alignment of the frames 1 to 12 at the proper separation distances, as will be described. A further line 30 is formed to define the outer edges of the sound tracks and to keep the sound tracks 27 within the boundary of the sheet 20.

Figure 2:
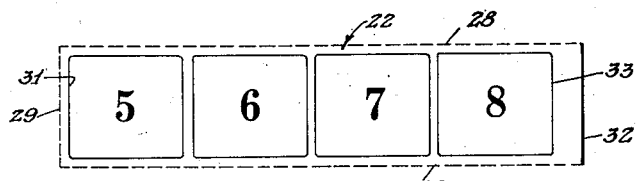
Figure 2 illustrates a picture strip properly severed from the comic sheet.

Figure 2 illustrates one of the comic strips 22 correctly severed from the sheet 20 preparatory to formation into the continuous strip with the other frames. The top and bottom boundary lines 28 are drawn in dotted lines to illustrate the severing along corresponding lines on sheet 20. Line 29 corresponds to the same line on sheet 20 at the left portion of the strip 22. Edge 29 is separated from the left edge 31 of frame 5 by a distance equal to the separation between the adjacent frames of the comic strips. The right edge 32 of the comic strip 22 is separated by any suitable distance from the corresponding right edge 33 of the adjacent frame 8. The portion of the strip 22 between edges 32 and 33 is used as the underlap portion in forming the continuous strip.

Figures 3, 5:
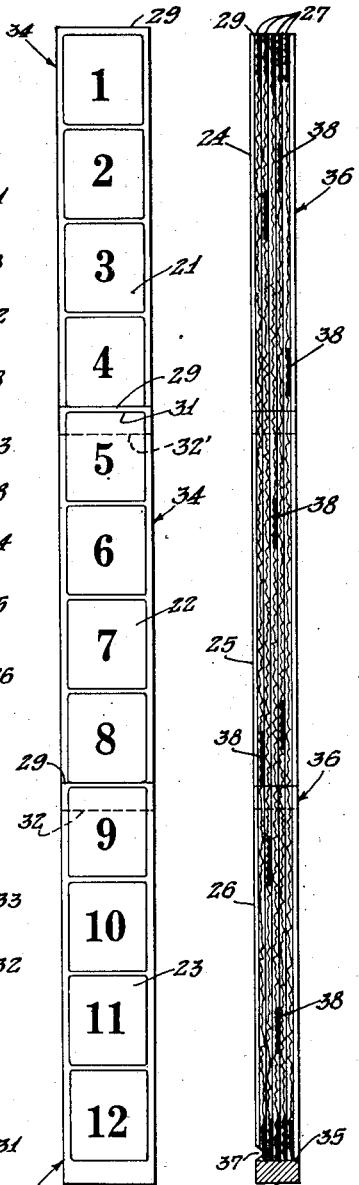
Figure 3 illustrates a continuous picture strip built up from the individual severed strips.
Figure 5 illustrates a continuous sound strip built up of the severed sound strips.

Figure 3 illustrates the continuous strip 34 formed of the picture or comic frame strips 21, 22 and 23. These strips are formed by pasting the edge 29 of strip 22 adjacent the outer edge of frame 4, the corresponding end 32' of strip 21 being pasted beneath the frame 5. The edge 29 serves as an accurate guide for forming the strips 21 and 22 in exact linear relationship, and the spacing between the edge 29 and line 31 automatically separates frame 4 and 5 by the same distance which the other frames are separated. In a similar manner, the strip 23 is secured to strip 22, frame 9 being pasted upon the underlap portion 32 to 33 of strip 22. If more than three strips containing frames are employed, they are similarly attached in series to form the comic or picture strip 34 to be projected by the apparatus of my present invention. I prefer to form the picture strip 34 into an endless belt form for projection thereof. This is accomplished by pasting the edge 29 adjacent the first frame 1 upon the underlap portion of the last strip 23 against the bottom edge of the last frame 12.

Figure 4:
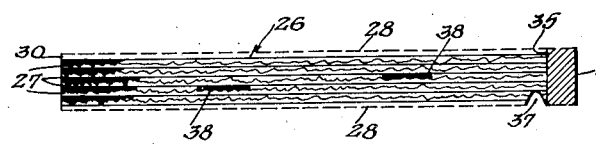
Figure 4 illustrates a sound strip properly severed from the comic sheet.

Figure 4 illustrates sound strip 26 severed from the newspaper sheet 20 having the bounding edges 28, 30 and 31. The perforated scored edges 28 are parallel to the sound tracks 27 and are spaced in a predetermined relation with respect to these sound tracks. The underlap region for the sound strip 26 corresponds to the portion between the line 35 defining the right edge of the sound tracks 27, and the edge 31 of the strip 26. This underlap region is shown darkened although it is not necessary to so arrange the strip. The sound tracks 27 correspond to the voice or description of the action or pictures represented in the frames 1 to 12. The sound tracks 27 are printed upon the sound strip by printing methods well known in the art. Variable area or variable density recording may be used, variable area recording being preferable for the newspaper work.

Figure 5 illustrates the continuous sound strip 36 formed of the individual sound strips 24, 25 and 26 by pasting the left end of each successive strip upon the underlap portions of the right end of the preceding strip. The sound tracks 27 communicate across the adjacent strips to form a plurality of continuous and parallel sound tracks of length equal to the whole length of the strip 36. The sound strip 36 is equivalent to the corresponding strip illustrated in Figure 5 of the above-mentioned application Serial No. 113,467. An endless strip is formed of strip 36 by pasting the top edge 29 of strip 24 adjacent edge 35 of strip 26 upon the underlap portion of strip 26.

A notch 37 is cut out at the end of the last track in strip 26. This notch is used to shift the sound track scanning mechanism to the next adjacent sound track when the apparatus has scanned one whole sound track so as to continue the scanning upon the next adjacent sound track of the endless form of the strip 36. The automatic shifting operation of the sound track scanning mechanism forms the basis of the original application Serial No. 113,467 where several methods for accomplishing this shifting operation are described.

In my present invention, the shifting between frames of the picture strip 34 is also accomplished automatically. I prefer to employ electrical signal impulses for performing the frame shifting operation, produced by the sound tracks. At predetermined portions of the sound tracks corresponding to the ends of the speech or the description for each frame, a characteristic sound or whistle is produced on the sound tracks to mark the end of the projection for that particular frame and initiate the shifting operation to quickly bring the next frame into view. The continuity of speech continues after the whistle or note is performed and the next frame is in view. I have marked darkened areas 38 upon the sound strips to illustrate the random portions of these strips at which the sound signals may be positioned. These positions correspond to the shifting of the successive frames in a predetermined relationship with the speech being reproduced.

Figure 6 illustrates one form of apparatus for carrying out the principles of my present invention. The picture strip 34 formed in an endless belt is arranged about pulleys 40 and 41. The position of top pulley 40 is adjustable by extension wire 42 so as to maintain strip 34 reasonably taut. Strip 34 passes through projection apparatus 43. Strip 34 passes in front of an opening in the optical system 44 equal to the width of one picture frame. A guide plate 45 guides the strip 34 against one side of the optical system 44. Plate 45 is preferably lightly biased by springs 46 against the strip 34. Plate 45 is preferably opaque to assist in the sharp projection of the pictures.

The illustrated optical system 44 contains two electric light sources 47 for illuminating the frame on the strip 34 opposite the opening in the enclosure 44. A lens system 48 projects the illuminated picture frame upon a ground glass screen 49 in enlarged form. The arrangement of the lenses and the direction of feed of the picture strip 34 is designed to produce an enlarged image on the screen 49 in upright relation for suitable viewing frrom the front of the projection apparatus 43. It is to be understood that other methods of projecting the frames of the picture strip 34 for visual perception may be employed with my present invention, the illustrated form being schematic. In a simpler form, the picture frame may be viewed directly without optical enlargement thereof so that the youngsters being entertained will know exactly which frame is being talked about during the sound accompaniment. My present invention is directed toward the automatic shifting of the successive frames into view in synchronism with the sound reproduction thereof, and not to the particular method of viewing the pictures.

The sound accompaniment is accomplished by employing the sound strip 36 in an endless form, in conjunction with the sound reproducing apparatus schematically illustrated at 50. The endless sound strip 36 is inserted between the guide and pressure rollers 51, 52 and 53. Roller 53 is supported by an adjustable wire 54 to keep the strip 36 reasonably taut. The electro-optical system including the light source 55, focusing lens 56 and photoelectric scanner 57 translate the varying light intensity beam 58 reflected from the sound tracks on strip 36 into electrical variations at the output 59 of scanner 57. The sound strip 36 is driven at a substantially constant speed. When one sound track is completely scanned, the notch 37 actuates shifting mechanism not illustrated to automatically shift the scanning over to the next adjacent sound track so as to continue the scanning operation in a continuous manner. The sound scanning shifting mechanism is described in detail in my copending application Serial No. 113,467 hereinabove referred to and is omitted from the illustration to simplify the disclosure. The electrical output from scanner 57 is connected to amplifier 60. The output terminals 61 of amplifier 60 connect to a loud speaker 62 for acoustically translating the electrical signals as sound at the projection apparatus 43 in conjunction with the picture being used.

The apparatus of Figure 6 illustrates a common motor 63 for driving both the sound and projection apparatus of my present invention. The whole apparatus may be embodied in a common housing. The motor 63 is energized from electrical supply line 64 and is continuously rotated at a substantially constant rate. Reduction gearing 65 connects the bevel gears 66 to the motor 63 at a predetermined reduction ratio for moving sound strip 36 at the predetermined speed. The reduction gearing 65 also connects motor 63 to the frame shifting mechanism 66 for shifting the picture strip 34 between frames in response to an electrical signal as will be described hereinafter.

A positive clutch 67—68 is used to connect the picture strip 34 drive with the shaft 70 of the gear box 65. Clutch member 68 is slidably fastened to shaft 70 and rotatable therewith. A yoke 71 coacting with an annular groove in the hub of clutch member 68 is used to move the clutch portion 68 along shaft 70 for engaging or disengaging with the clutch portion 67. Yoke 71 is integrally attached to an armature 72 coacting with a relay 73. A pivot 74 is placed between the yoke 71 and armature 72. A spring 75 mechanically biases the clutch 67—68 into open position.

The beveled gears 76 are driven by the clutch member 67 for driving the picture strip 34. A brake 77 integral with and extending from the yoke 71 and armature 72 is used to stop the movement or drive of the beveled gears 76 as soon as the clutch 67—68 is disengaged. The biasing spring 75 simultaneously disengages clutch 67—68 when the relay 73 is deenergized, and simultaneously engages the brake 77 to stop the rotation of the beveled gears 76 after the frame shifting operation has been performed.

The frame shifting operation is performed when the predetermined note or sound portion 38 occurs on the sound tracks hereinabove described. This note may be a constant frequency signal such as a thousand cycles. When a pure note section 38 passes opposite scanner 57, a corresponding electrical current is produced by amplifier 60. Output terminals 78 of amplifier 60 are connected to a filter 80 which is adjusted to the frequency of the predetermined note, for example a thousand cycles. A different frequency can be used but one thousand cycles is chosen for illustration. Filter 80 is tuned to sufficient gass a thousand cycles current to the relay 33 and reject other frequency currents in a manner well known in the art. The relay 73 will accordingly be energized during the interval of the predetermined thousand cycle note portion 38 on the sound tracks and attract armature 72. By attracting armature 72, brake 77 is released and the positive clutch 67—68 is engaged to drive the picture strip 34 from the motor 63 through the gear box 65. The frame shifting operation accordingly occurs while armature 72 is attracted to relay 73. The time required for executing the frame shifting operation depends upon the width of the frame and the rate of feed of the strip 34. In this modification, the length of the sound portion 38 on the sound tracks is made long enough to render the thousand cycle note for the time required to execute the frame shifting operation.

The relay 73 may operate directly from the alternating current thousand cycle note output of filter 80. However, a direct current relay may be used instead if the filter current is rectified. The predetermined note corresponding to sound portions 38 to effect the frame shifting operation may be a pleasant whistle or sound for the listener to hear during the frame shifting which may take less than two seconds to effect. However, by employing a note absorber 81 across the output 61 of amplifier 60 sharply tuned to absorb or attenuate the thousand cycle note, the whistle may be practically eliminated from the output of loud speaker 62. Such a sharp note absorber or filter 81 would not materially affect the intelligibility of the sound reproduction. Other notes may be combined with the predetermined thousand cycle note to form a pleasant sound effect at speaker 62 without a note absorber 81. The note filter 80 need only respond to a predominant frequency such as a thousand cycles and will have sufficient energy to maintain armature 72 attracted during the shifting cycle.

Figure 7 illustrates a modification for the frame shifting mechanism responsive to the filter 80 signals. A separate motor 82 energized from power lines 83 is used for the frame shifting mechanism. A pinion 84, directly connected to motor 82 drives a gear 85 which is connected to the friction pulley 86 for driving the picture strip 34. A roller 87 presses the picture strip 34 against drive roller 86.

A disk 88 is secured to the gear 85 drive. The periphery of the disk 88 contains a notch 89. A lever 90 contains a projection 91 which coacts with the periphery of disk 88. Lever 90 is mechanically biased against the periphery of disk 88 by spring 92. The projection 91 engages with the notch 89 and holds the disk 88 against rotation during this engagement.

The motor 82 is designed to permit stalling of its armature without over-heating. The motor 82 drives the picture strip 34 until the projection 91 stops the rotation of disk 88. When a signal impulse is received by relay 73, it attracts the armature portion 93 away from disk 88, releasing the engagement thereof. Disk 88 is accordingly permitted to revolve for one revolution which is designed to be equal to the frame shifting requirements. The signal impulse at relay 73 in this modification need only be of relatively short duration as compared to the modification of Figure 6. The signal impulse disengages the lever 90 and disk 88, permitting the disk to rotate. Before one revolution of disk 88, the signal is completed and the motion of the disk is arrested during the projection of the particular frame in view.

The motor 82 accordingly is continuously energized from the power lines 83 but acts to revolve drive pulley 86 only for the frame shifting movements as will now be evident. The frame shifting signal of the modification of Figure 7 may be of only a relatively short duration. To accurately differentiate the thousand cycle note or signal from any of the voice frequencies, a sharply tuned filter may be used in conjunction with a marginal responsive relay operation well known in the electrical art. The printed signal corresponding to areas 38 of the sound tracks may be made of greater amplitude for actuating the marginally responsive relay corresponding to relay 73.

Figure 8 illustrates a further modification for effecting the frame shifting operation in response to the signal operated relay 73. The mechanism of this modification is similar to that of Figure 7 except that a spring wound motor 94 is used instead of the electrical motor 82. The spring wound motor 94 contains a gear 95 which engages with pinion 96 to continuously tend to drive the friction pulley 86 directly connected thereto, for effecting the movement of strip 34. The projection 91 of lever 90 cooperates with notch 89 to maintain the individual frames in view until a frame shifting signal current flows into relay 73 to attract the armature 93 for disengaging disk 88 and permitting it to revolve for one frame shifting revolution. This modification employing a spring motor is relatively inexpensive to manufacture and would be employed for the cheaper models for children.

Figure 9 illustrates a further modification for performing the frame shifting operation in response to the signal areas 38 on the sound tracks. The projection mechanism 43 for projecting a frame of sound strip 34 upon the ground glass screen 49 contains the optical system 44 similar to that of Figure 6. The sound reproducing mechanism 50 is schematically represented similar to that of Figure 6, like numerals referring to similar components.

Modifications in this figure specifically reside in the mechanism for feeding and guiding the picture strip 34, and in the mechanism for performing the frame shifting thereof. Common motor drive 63 is connected to the reduction gearing box 65 which directly drives the beveled gears 66 at a continuous rate for operating the sound recording strip 36. The picture strip drive is transmitted through the shaft 70 projecting from gear box 65. The shaft 70 is connected to a friction clutch 100, the output of which is connected to a torsion spring 101. Torsion spring 101 is in effect an accumulating spring which is wound up when the torsional potential energy stored up in the spring causes the friction clutch 100 to slip. Enough torsional energy is stored up in spring 101 to move the picture strip 34 through at least one frame shifting operation. Torsional spring 101 is directly connected to beveled gears 102 which drive gear 103 connected to gear 104. Gear 104 is connected to the drive pulley 105 for the picture strip 34. A disk 106 is secured to the common shaft of gear 104 and pulley 105.

The torsional energy accumulated by spring 101 continuously tends to rotate the drive pulley 105 similar to the modifications of Figures 7 and 8 where the electric and spring motors respectively create a potential drive condition between frame shifting operations. The projection 107 at the end of lever 108 engages one of the notches 109 of the disk 106 until relay 73 attracts armature 110 of lever 108 to unlock the disk 106 to permit it to rotate sufficiently for one frame shifting operation. The driving of the picture strip 34 occurs during the rotation of disk 106 by the torsional spring 101 energization. Two notches are arranged on disk 106, 180° apart so that one revolution of disk 106 corresponds to two frame shifting operations. Still more notches may be used for correspondingly more shiftings per revolution of disk 106, the determining factor naturally being the ratio of diameters between disk 106, drive pulley 105 and the length of each frame.

A pawl and ratchet arrangement 111—112 is used to prevent the torsional spring 101 from unwinding when the clutch 100 starts to slip at the fully wound condition thereof. Figure 11 shows an end view of the ratchet and pawl 111—112 arrangement for holding the torsional spring in fully wound condition after being wound up across the frictional clutch 100 by the shaft 70 operating through the gear box 65 from motor 63. When spring 101 gives up some of its stored energy for a film shifting operation or two, the clutch 100 automatically reengages to continue to wind up spring 101 since its stored energy becomes insufficient to cause the clutch to slip. In this manner, the frame shifting energization is automatically maintained without a separate motor drive.

The picture strip 34 of Figure 9 is driven by two coacting belts 113 and 114 in frictional engagement with the endless strip 34. Belts 113 and 114 are arranged on pulleys 105 and 115 parallel to the frame shifting direction. Belts 113 and 114 are preferably operated with a positive driving connection. A suitable positive drive is a sprocket drive. Figure 10 is a partial illustration showing the sprocket holes 116 in the sides of the friction belt 114 engaging the sprocket idler pulley 115. The sprocket holes extend beyond the width of the picture strip 34 so that the sprocket teeth of the pulleys will not interfere with the picture strip 34. A gear 120 for driving the belt system 113 is engaged with pulley 104 for a direct driving condition.

A series of pressure plates 117 are held against the internal surfaces of the friction belts 113 and 114 by springs 118. Figure 12 is a cross-sectional view taken along 12—12 of Figure 9 showing the relationship between the outer pressure plates 117 holding together the friction belts 113—114 which hold in engagement the picture strip 34. The picture strip 34 is accordingly driven in a positive manner through the accumulating torsion spring 101 whenever relay 73 is energized to permit the disk 106 to advance by one notch. The frame shifting operation is accordingly automatically performed during a suitable signal impulse passing through filter 80 to a relay 73 when a predetermined area 38 of the sound strip is being scanned at the sound recording apparatus 50.

Further modifications of my present invention may be made which fall within the broader spirit and scope of my invention and accordingly I do not intend to be limited except as set forth in the following claims.

I claim:

1. In a projecting device for a plurality of picture frames arranged in a continuous strip, means for reproducing sound for the picture frames from a separate sound record for controlling the movement of said strip; means for advancing said strip comprising a spring wound motor, apparatus for engaging with said strip, and means for driving said apparatus by said motor including mechanism for stopping the driving when the strip has advanced one frame comprising a disc having a peripheral notch and a lever having a projection for normally engaging said notch; and means for shifting said strip in response to the scanning of a predetermined signal on said sound record for attracting said lever away from said disc to permit the disc to rotate until reengagement thereof by said lever.

2. In a projecting device for a plurality of picture frames arranged in a continuous strip, means for reproducing sound for the picture frames from a separate sound record for controlling the movement of said strip; means for advancing said strip comprising a motor, apparatus for engaging with said strip, and means for driving said apparatus by said motor including mechanism for stopping the driving when the strip has advanced one frame comprising a disc having a peripheral notch and a lever having a projection for normally engaging said notch; and means for shifting said strip by one frame in response to the scanning of a predetermined signal area marked on said sound record comprising means for generating current from the scanning of said signal area and a magnet responsive to the signal current for attracting said lever away from said disc to permit the disc to rotate until reengagement thereof by said lever.

3. In a projecting device for a plurality of picture frames arranged in a continuous strip and a separate sound strip containing a sound record for the picture frames and for controlling the operation of said frame strip; a motor for independently operating both said sound and picture strips; means connected to said motor for continuously driving said sound strip; means for scanning the driven sound record for reproducing sound corresponding to each frame while the frame is stationary and being projected; mechanism operable by said motor for engaging with said picture strip and intermittently shifting said picture strip frame by frame; apparatus for rendering the operation of said mechanism by said motor ineffectual during the sound recording periods; and electromechanical means responsive to a predetermined scanned signal area marked on said sound record for operating said apparatus to engage said mechanism with said motor to shift said picture strip to the next successive frame between sound recordings.

4. In a projecting device for a plurality of picture frames arranged in an endless strip and a separate endless sound strip containing a sound record for the picture frames and for controlling the operation of said frame strip; a motor for independently operating both said sound and picture strips; means connected to said motor for continuously driving said sound strip; means for scanning the driven sound strip for generating corresponding electrical currents; and sound reproducing means responsive to said currents for reproducing sound corresponding to each frame while the frame is stationary and being projected; mechanism operable by said motor for intermittently engaging with said picture strip and shifting said picture strip frame by frame; apparatus for rendering the operation of said mechanism by said motor ineffectual during the sound recording periods; and electromagnetic means in circuit with said reproducing means responsive to currents of a predetermined frequency produced when predetermined signal areas on said sound record are scanned for operating said apparatus to engage said mechanism with said motor to shift said picture strip to the next successive frame.

5. In a projecting device for a plurality of picture frames arranged in a continuous strip and a separate sound strip containing a sound record for the picture frames and for controlling the operation of said frame strip; a motor for independently operating both said sound and picture strips; means connected to said motor for continuously driving said sound strip; means for scanning the driven sound strip for generating corresponding electrical currents; and sound reproducing means responsive to said currents for reproducing sound corresponding to each frame while the frame is stationary and being projected; mechanism operable by said motor for intermittently engaging with and shifting said picture strip frame by frame; apparatus for rendering the operation of said mechanism by said motor ineffectual during the sound recording periods; electromagnetic means in circuit with said reproducing means responsive to currents of a predetermined frequency produced when predetermined signal areas on said sound record are scanned for operating said apparatus to engage said mechanism with said motor to shift said picture strip to the next successive frame; and means for absorbing currents of said predetermined frequency before they reach said sound reproducing means to prevent sound reproduction thereof.

6. In a projecting device for a plurality of picture frames arranged in a continuous strip and for a separate sound record for controlling the operation of said strip: a motor for independently operating both said picture strip and said sound record; means connected to said motor for continuously driving said sound record; means for scanning the driven sound record for reproducing sound corresponding to each frame while the frame is stationary and being projected; and mechanism operable by said motor engaging with said picture strip and for intermittently shifting said picture strip frame by frame comprising a shaft continuously driven by said motor, means for moving said strip, a clutch having a first member engaging said strip moving means and a second member rotated by said shaft, a lever coacting with one of said clutch members normally biased to maintain said clutch disengaged and said picture strip stationary, and electromagnetic means electrically responsive to a predetermined signal scanned on said sound record for operating said lever to engage said clutch for motivating said strip to position the next picture frame for projection.

7. In a projecting device for a plurality of picture frames arranged in a continuous strip and for a separate sound record for controlling the operation of said strip: a motor for independently operating both said picture strip and said sound record; means connected to said motor for continuously driving said sound record; means for scanning the driven sound record for reproducing sound corresponding to each frame while the frame is stationary and being projected; and mechanism operable by said motor engaging with said picture strip and for intermittently shifting said picture strip frame by frame comprising a shaft continuously driven by said motor, means for moving said strip, a clutch having a first member engaging said strip moving means and a second member rotated by said shaft, a lever coacting with one of said clutch members normally biased to maintain said clutch disengaged and said picture strip stationary, electromagnetic means electrically responsive to a predetermined signal scanned on said sound record for operating said lever to engage said clutch for motivating said strip to position the next picture frame for projection, and a brake member extending from said lever operative to arrest movement of said strip moving means when said clutch is disengaged to insure proper positioning of the shifted frames.

8. In a projecting device for a plurality of picture frames arranged in a continuous strip and for a separate sound record for controlling the operation of said strip; a motor for independently operating both said picture strip and said sound record; means connected to said motor for continuously driving said sound record; means for scanning the driven sound record for reproducing sound corresponding to each frame while the frame is stationary and being projected; and mechanism operable by said motor engaging with said picture strip and for intermittently shifting said picture strip frame by frame comprising a shaft continuously driven by said motor, means for moving said strip, a tortional spring interconnecting said strip moving means with said shaft, apparatus for winding-up said spring by said motor to store rotative force therein, and means for intermittently releasing said strip moving means a predetermined amount including electromagnetic means responsive to a predetermined signal scanned on said sound record to advance said strip by one frame.

9. In a projecting device for a plurality of picture frames arranged in a continuous strip and for a separate sound record for controlling the operation of said strip: a motor for independently operating both said picture strip and said sound record; means connected to said motor for continuously driving said sound record; means for scanning the driven sound record for reproducing sound corresponding to each frame while the frame is stationary and being projected; and mechanism operable by said motor engaging with said picture strip and for intermittently shifting said picture strip frame by frame comprising a shaft continuously driven by said motor, means for moving said strip, a spring interconnecting said strip moving means with said shaft, apparatus for winding-up said tortional spring by said motor to store rotative force therein including a clutch and a pawl and ratchet arrangement, and means for intermittently releasing said strip moving means a predetermined amount comprising a notched disc and a coacting lever biased against said disc, and electromagnetic means responsive to a predetermined signal scanned on said sound record for operating said lever to permit said disc to rotate between successive notches to advance said strip by one frame.

10. In a projecting device for a plurality of picture frames arranged in a continuous strip and for a separate sound record for controlling the operation of said strip; a source of motive power, mechanism engaging with said picture strip and for intermittently shifting said picture strip frame by frame, a disc having a notch, means mechanically interconnecting said disc with said source of motive power, said disc being connected with said mechanism for driving said mechanism, a lever for coacting with the notch on said disc normally biased towards the notch to prevent movement of said disc, and means electrically responsive to a predetermined signal scanned on said sound record for operating said lever to permit said disc to rotate and advance said strip by one frame.

11. In a projecting device for a plurality of picture frames arranged in a continuous strip and for a separate sound record for controlling the operation of said strip: a source of motive power, mechanism engaging with said picture strip and for intermittently shifting said picture strip frame by frame, a disc having a plurality of equi-spaced notches, means mechanically interconnecting said disc with said source of motive power, said disc being connected with said mechanism for driving said mechanism, a lever for coacting with the notches on said disc normally biased towards the notches to prevent movement of said disc, and electromagnetic means responsive to a predetermined signal scanned on said sound record for operating said lever to permit said disc to rotate between successive notches and advance said strip by one frame.

12. In a projecting device for a plurality of picture frames arranged in a continuous strip and for a separate sound record for controlling the operation of said strip: a motor; means connected to said motor for continuously driving said sound record; means for scanning the driven sound record for reproducing sound corresponding to each frame while the frame is stationary and being projected comprising an electronic amplifier responsive to said scanning means, and a sound translating unit electrically connected to the output of said amplifier; mechanism engaging with said picture strip and for intermittently shifting said picture strip frame by frame; electromagnetic means responsive to a predetermined audio frequency signal scanned on said sound record for actuating said mechanism to shift said strip by one frame; and electrical means associated with said amplifier and said sound translating unit for absorbing said predetermined audio frequency signal to prevent sound reproduction thereof.

13. In a projecting device for a plurality of picture frames arranged in a continuous strip and having a separate record for controlling the shifting of said strip and a scanner for said record: a motor; mechanism operable by said motor for engaging with and intermittently shifting said picture strip frame by frame whenever a control signal area on said record is scanned including a pair of endless flexible bands arranged to include said strip therebetween, a springbiased member for pressing said strip and bands into frictional engagement, and apparatus for motivating said bands in unison for advancing said strip including separate drive wheels for said bands, gearing interlinking said drive wheels, and electromechanical means responsive to the scanned control signals for permitting said gearing to be intermittently driven from motive power of said motor whereby said bands drive said picture frame strip into the successive frame projection position by frictional engagement in response to a control signal.

WILLIAM G. H. FINCH.